(12) United States Patent
Gunter et al.

(10) Patent No.: US 12,293,093 B2
(45) Date of Patent: May 6, 2025

(54) CONTROL OF DETERMINISTIC MACHINE LEARNING SYSTEMS USING TRIGGER TABLES AND CONFIGURATION STATE REGISTRIES

(71) Applicant: Google LLC, Mountain View, CA (US)

(72) Inventors: Michial Allen Gunter, Oakland, CA (US); Reiner Pope, Mountain View, CA (US); Brian Foley, Seattle, WA (US); Charles Henry Leichner, IV, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 86 days.

(21) Appl. No.: 17/852,059

(22) Filed: Jun. 28, 2022

(65) Prior Publication Data
US 2022/0413721 A1 Dec. 29, 2022

Related U.S. Application Data

(60) Provisional application No. 63/215,680, filed on Jun. 28, 2021.

(51) Int. Cl.
*G06F 3/06* (2006.01)
*G06F 7/544* (2006.01)

(52) U.S. Cl.
CPC .......... *G06F 3/0629* (2013.01); *G06F 3/0604* (2013.01); *G06F 3/0679* (2013.01); *G06F 7/5443* (2013.01)

(58) Field of Classification Search
CPC .... G06F 3/0629; G06F 3/0604; G06F 3/0679; G06F 7/5443; G06F 15/7878; G06F 15/8053; G06N 3/063
See application file for complete search history.

(56) References Cited

U.S. PATENT DOCUMENTS

| | | | |
|---|---|---|---|
| 8,656,141 B1 * | 2/2014 | Agarwal | G06F 15/17381 710/22 |
| 11,249,872 B1 * | 2/2022 | Thangavel | G06F 11/2221 |
| 2007/0053355 A1 * | 3/2007 | Liu | H04L 45/60 370/389 |

(Continued)

FOREIGN PATENT DOCUMENTS

| WO | WO-2020244735 A1 * | 12/2020 |
|---|---|---|
| WO | WO 2021/035015 | 2/2021 |

OTHER PUBLICATIONS

Extended Search Report in European Appln. No. 22181504.6, dated Nov. 29, 2022, 9 pages.

*Primary Examiner* — Michael Krofcheck
(74) *Attorney, Agent, or Firm* — Fish & Richardson P.C.

(57) ABSTRACT

A method includes: receiving control data at a first data selector of a plurality of data selectors, in which the control data comprises (i) a configuration registry address specifying a location in a configuration state registry and (ii) configuration data specifying a circuit configuration state of a circuit element of a computational circuit; transferring the control data, from the first data selector, to an entry in a trigger table registry; responsive to a first trigger event occurring, transferring the configuration data to the location in the configuration state registry specified by the configuration registry address; and updating a state of the circuit element based on the configuration data.

24 Claims, 7 Drawing Sheets

(56) References Cited

U.S. PATENT DOCUMENTS

2013/0198486 A1\* 8/2013 Nakajima ............... G06F 12/02
　　　　　　　　　　　　　　　　　　　711/206
2016/0259757 A1　 9/2016 Metzgen
2019/0146700 A1\* 5/2019 Gschwind .......... G06F 9/30043
　　　　　　　　　　　　　　　　　　　711/170

\* cited by examiner

CONTROL OF DETERMINISTIC MACHINE LEARNING SYSTEMS USING TRIGGER TABLES AND CONFIGURATION STATE REGISTRIES

CROSS-REFERENCE TO RELATED APPLICATIONS

This application claims the benefit of priority under 35 U.S.C. § 119 to U.S. Provisional Application Ser. No. 63/215,680, filed Jun. 28, 2021, the entirety of which is incorporated herein by reference.

BACKGROUND OF THE INVENTION

This disclosure relates to control of machine-learning systems. A machine-learning system includes an application-specific integrated circuit (ASIC) that is designed for performing highly parallel synchronous operations. The parallelism is achieved by integrating many different independent processing elements that can execute concurrently.

Such devices are well-suited for accelerating inference passes through neural networks. Neural networks are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Typically the computational operations required for each layer can be achieved by performing matrix multiplications. Often one of the matrices is a vector, e.g., a matrix-by-vector multiplication. Machine-learning accelerators thus allow the multiplies and adds of a matrix multiplication to be performed with high parallelism.

SUMMARY OF THE INVENTION

The present disclosure relates to control of deterministic systems, including deterministic machine-learning systems, deterministic sub-systems, and to systems and/or sub-systems that are deterministic occasionally or always. In particular, the techniques described herein relate to distributed and local control of hardware elements, in which configuration states for hardware elements are maintained locally and updated through the use of local tables that provide changes to the configuration states based upon specified conditions taking place. Particular embodiments of the subject matter described herein can be implemented so as to realize one or more of the following advantages. For instance, in some implementations, multiple parallel processing threads for performing different operations can be created without requiring a centralized control system to monitor and regulate operation of the entire system. Additionally, in certain embodiments, the techniques disclosed herein can be implemented so as to maintain low local memory usage for storing data such as control instructions, configuration states for loop structures, and memory addresses, among other types of data.

In general, in some aspects, the subject matter of the present disclosure is embodied in methods that include: receiving control data at a first data selector of a plurality of data selectors, in which the control data comprises (i) a configuration registry address specifying a location in a configuration state registry and (ii) configuration data specifying a circuit configuration state of a circuit element of a computational circuit; transferring the control data, from the first data selector, to an entry in a trigger table registry; responsive to a first trigger event occurring, transferring the configuration data to the location in the configuration state registry specified by the configuration registry address; and updating a state of the circuit element based on the configuration data.

Implementations of the methods can include one or more of the following features. For instance, in some implementations, the circuit element includes the first data selector of the plurality of data selectors, a first counter of at least one counter, a first address generator, or a first memory element of a memory device.

In some implementations, the method is performed by a computational circuit, and the computational circuit is a component of a machine-learning accelerator.

In some implementations, the control data includes a trigger ID, in which the trigger ID comprises a trigger ID counter, and the method further includes iterating a change in a value of the trigger ID counter until a predetermined counter value is obtained, the first trigger event including the trigger ID counter reaching the predetermined value.

In some implementations, the entry in the trigger table includes an enable flag that indicates whether the entry is active or inactive.

In some implementations, the entry in the trigger table includes a fired flag that indicates whether a trigger event for the entry occurred within a previous clock cycle.

In some implementations, the first trigger event includes a transfer, during a previous clock cycle, configuration data from another entry in the trigger table registry to the configuration state registry.

In some implementations, the first trigger event includes a first counter of the at least one counter reaching a predetermined value. Responsive to the first trigger event occurring, the method may further include transferring configuration data from another entry in the trigger table registry to the configuration state registry.

In some implementations, the configuration data identifies a first address generator from which a first memory element of the memory device selects a memory address for reading or writing.

In some implementations, the computational circuit includes an arithmetic logic unit including an array of multiply-accumulate cells.

In general, in some aspects, the subject matter of the disclosure is embodied in devices, such as computational circuits that include: a memory device; a plurality of data selectors; at least one counter; a trigger table registry; and a configuration state registry, in which the trigger table registry is configured to pass configuration data stored in one or more entries of the trigger table registry to the configuration state registry upon the occurrence of one or more trigger events, and in which the configuration state registry specifies a state of one or more of the memory device, the data selectors, and the at least one counter.

Implementations of the devices can include one or more of the following features. For example, in some implementations, the computational circuit is a component of a machine-learning accelerator.

In some implementations, the trigger table registry includes multiple entries, and each entry of the multiple entries stores control data including a corresponding (i) configuration registry address specifying a location in the configuration state registry and corresponding (ii) configuration data specifying a circuit configuration state of a circuit element of the computational circuit. Each entry of the multiple entries can, in some implementations, store a corresponding trigger ID, in which the trigger ID of at first entry of the multiple entries includes a trigger ID counter that signals, upon reaching a predetermined value, a corresponding trigger event for the first entry. Alternatively, or in addition, each entry of the multiple entries can, in some implementations, store a corresponding enable flag that indicates whether the entry is active or inactive. Alternatively, or in addition, each entry of the multiple entries stores a fired flag that indicates whether a trigger event for the entry occurred within a previous clock cycle.

In some implementations, a first entry of the configuration state registry and a second entry of the configuration state registry are coupled as a first input and a second input, respectively, to a first data selector of the plurality of data selectors, in which a third entry of the configuration state registry is coupled to a control input of the first data selector.

In some implementations, a first entry of the configuration state registry is coupled to at least one address generator of the computational circuit, in which an output of the at least one address generator is coupled to at least one memory element of the memory device, and the output of the at least one address generator provides a memory address.

In some implementations, the computational circuit includes an arithmetic logic unit that includes an array of cells, each cell configured to perform a multiply and accumulate operation.

In general, in some aspects, the subject matter of the present disclosure is embodied in methods that include: setting a first control element of a first circuit device in a first state; initiating a timer to count a predetermined number of clock cycles; and responsive to the timer counting the predetermined number of clock cycles, updating the first control element to a second state, in which updating the first control element comprises transferring configuration data from a configuration state registry to the first control element, in which the configuration state registry includes multiple predefined configuration states for multiple control elements of the first circuit device.

In some implementations, setting the first control element of the circuit device in the first state includes transferring first predefined configuration state data from the configuration state registry to the first control element.

In some implementations, setting the first control element of the circuit device in the first state comprises firing a first trigger for a first trigger table entry in a trigger table registry so that a first configuration state entry of the configuration state registry is updated to include the first predefined configuration state data.

In some implementations, the configuration data includes second predefined configuration state data, and updating the first control element comprises: firing a second trigger for a second trigger table entry in the trigger table registry so that a second configuration state entry of the configuration state registry is updated to include the second predefined configuration state data; and transferring the second predefined configuration state data from the configuration state registry to the first control element.

In some implementations, the first circuit device is a circuit subsystem of a system that includes multiple circuit subsystems, in which each circuit subsystem of the multiple circuit subsystems includes: corresponding control elements; and a corresponding configuration state registry that includes predefined configuration states for the corresponding control elements.

In some aspects, the subject matter of the present disclosure is embodied in methods that include: generating, by an address generator, a first address; obtaining, based on the first address, a first data value from a local memory unit; providing the first data value to a first circuit element of a circuit device; generating, by the address generator, a second address; obtaining, based on the second address, first configuration data from the local memory unit; and configuring the first circuit element to be in a first state based on the first configuration data so as to act on the first data value, in which the first circuit element is configured to be in the first state at a same time that the first data value is provided to the first circuit element.

In some implementations, the local memory unit is a first local memory unit of multiple local memory units in the device, in which each local memory unit of the multiple local memory units is associated with a corresponding subsystem of the device, and in which each subsystem includes corresponding multiple circuit elements.

In some aspects, the subject matter of the present disclosure is embodied in methods for executing loops, in which the methods include: storing configuration state data for multiple iterations of a first loop in a local registry table, in which the configuration state data for the first loop includes control data for setting a state of a first control element in the a circuit device; iterating through the first loop, in which at each iteration of the first loop a state of the first control element is updated based on the configuration data corresponding to the iteration of the first loop stored in the local registry table.

In some implementations, the first loop is a first inner loop of a nested loop, and the method includes: storing configuration state data for an iteration of a first outer loop of the nest loop in a local memory of the circuit device.

In some implementations, the configuration state data for the iteration of a first outer loop includes a configuration state for an address generator, a counter, or a data selector.

In some implementations, the method includes retrieving the configuration state data for the iteration of the first outer loop from the local memory after a last iteration of the first inner loop.

In some implementations, retrieving the configuration state data for the iteration of the first outer loop includes storing the configuration state data for the iteration of the first outer loop in the local registry table. Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the subject matter will become apparent from the description, drawings and the claims.

DETAILED DESCRIPTION

Figure 1:
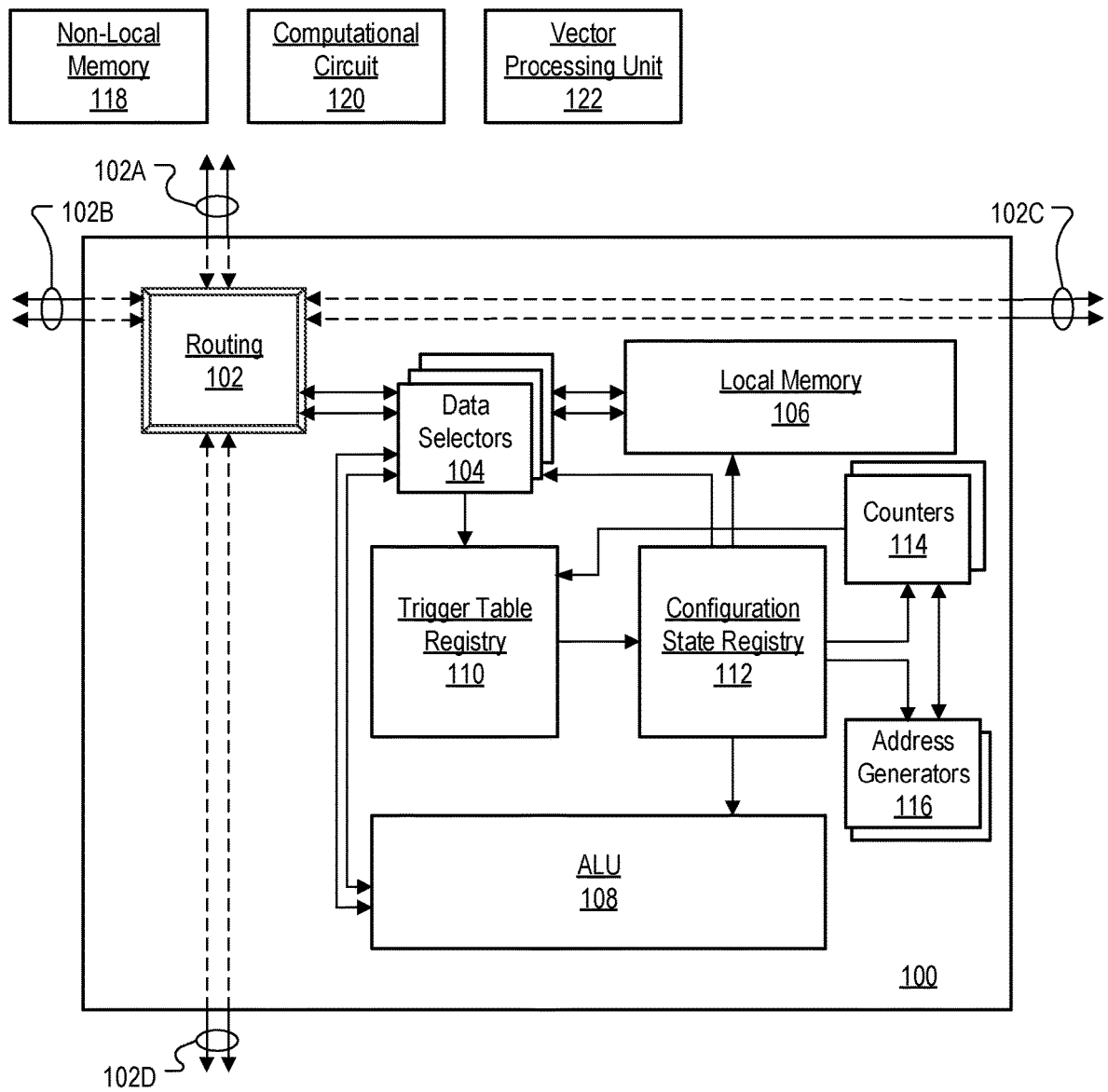
FIG. 1 is a schematic illustrating an example of a subsystem of a machine-learning system.

The present disclosure relates to control of machine-learning systems. In particular, the techniques described herein relate to distributed and local control of hardware elements, in which configuration states for hardware elements are maintained locally and updated through the use of local tables that specify changes to the configuration states based upon predefined conditions taking place. Particular embodiments of the subject matter described herein can be implemented so as to realize one or more of the following advantages. For instance, in some implementations, multiple parallel processing threads for performing different operations can be created without requiring a centralized control system to monitor and regulate operation of the entire system. Additionally, in certain embodiments, the techniques disclosed herein can be implemented so as to maintain low local memory usage for storing data such as control instructions, configuration states for loop structures, and memory addresses, among other types of data. Other advantages will become apparent from the description, drawings, and claims.

In traditional non-deterministic central processing units (CPUs), control instructions for the functional hardware elements of the computing system are typically fetched and issued every cycle from memory dedicated to the CPU itself, and may be directed according to specified addresses of registers associated with the various functional units.

In contrast, in a synchronous deterministic processor, functional hardware elements can be constrained to operate under statically timed control so that operations are performed synchronously according to a predefined timing schedule. As an example, the state of a particular functional hardware element, such as a multiplexor, may be set to receive a control instruction changing the state of the hardware element after a predefined period of time. The synchronous deterministic operation of the processor allows, in certain embodiments, more control, efficiency, and confidence in the outcome than can be obtained using a non-deterministic CPU. For instance, in a traditional non-deterministic CPU architecture, specifying that multiple pieces of data meet in exactly the same place at exactly the same time may require advanced knowledge of hard to determine (or even unknowable) future delays so the data can be buffered at exactly the right time. In a deterministic architecture, however, the hardware can be configured in such a way that pertinent delays can be determined in advance and movement of data can be structured with precise knowledge of when and where data should be according to a fixed schedule.

An additional advantage of synchronous deterministic processing is that, in certain embodiments, control can be performed locally. That is, rather than having a single centralized component, distributed control mechanisms can be implemented across the processor to control subsets of the system hardware, such that different threads of operations can be run in parallel. In a particular example, running loops in a centralized control structure using a non-deterministic CPU is dependent on a single source of control instructions. In contrast, with localized control in synchronous deterministic systems, different loop structures can be implemented in parallel across different subsets of the hardware.

Further, traditional non-deterministic central processing units may place physical constraints on the layout of the chip device. For example, in some implementations, it may be necessary to design for and arrange wiring from the centralized control component to all the hardware components that depend on the state of the centralized control component, which may lead to increased chip design and fabrication costs (e.g., due to need for more physical space), and may degrade chip performance (e.g., the chip may be unable to run at higher clock frequency due to a high load on the centralized control component). In contrast, in a synchronous deterministic system, such additional wiring is, in some implementation, unnecessary, allowing for improved chip performance.

FIG. 1 is a schematic illustrating an example of a subsystem 100 of a machine-learning system, in which the subsystem 100 is configured to allow local synchronous control of the components within subsystem 100. A machine-learning system can typically have many instances of the components of the subsystem 100 illustrated in FIG. 1. A more detailed example of a machine-learning device that integrates the components of FIG. 1 into a larger system is described in more detail below with reference to FIG. 7. Although the apparatus shown in FIG. 1 is described as a subsystem of a larger system, the techniques described herein can be applied to standalone systems or systems that are not replicated similar to the tiles shown in FIG. 7.

The subsystem 100 is configured to cause concurrent state changes in a synchronous deterministic manner. More particularly, the subsystem 100 is configured to perform computations, such as arithmetic computations, in a synchronous deterministic manner. The subsystem 100 includes routing 102, at least one data selector 104, local memory 106, at least one computational unit (also referred to as an arithmetic logic unit or ALU) 108, at least one trigger table registry 110, at least one configuration state registry 112, at least one counter 114, and at least one address generator 116. In a particular example, the subsystem 100 can as part of a neural network layer to receive input data, such as an input tensor of activation values and an input tensor of weight values, perform mathematical operations on the input tensors (e.g., in the ALU 108), and provide outputs resulting from the mathematical operations. One or more operations of the subsystem 100 may be performed at each cycle of a global clock of the system, at each cycle of a local clock of the subsystem, or alternatively, or in addition, at one or more multiples of cycles of a global and/or local clock.

Generally, data flows into and from the subsystem 100 through routing 102. Routing 102 can include, e.g., wiring, traces or any suitable hardware for providing communication to and from subsystem 100, including to and from the components of the subsystem 100. As shown in the example of FIG. 1, routing 102 is not limited to a single element for transmission of data and instead can include multiple routing elements. In some implementations, the routing elements 102 can be arranged so as to extend along different cardinal directions. For instance, in an example in which the subsystem 100 is part of a larger two-dimensional array of subsystems 100, the routing 102 can extend along orthogonal directions of the array. Routing 102 can include one or more of routing 102A that extends above the subsystem 100 within a 2D plane, one or more of routing 102B that extends to the left of the subsystem 100 within the 2D plane, one or more of routing 102C that extend to the right of the subsystem 100 within the 2D plane, and/or one or more of routing 102D that extends below the subsystem 100 within the 2D plane. The routing 102 can connect to other subsystems and/or to other components of the machine-learning system. For instance, the routing 102 can connect, either directly or indirectly through other subsystems, to non-local memory 118, one or more other computational circuits, or one or more vector processing units.

The data transferred on routing 102 can include data to be manipulated or otherwise used in computational operations, such as mathematical operations. Examples of such data include activation data and weight data used in tensor operations of neural networks. Data transferred on routing 102 also can include control data. Control data includes data that sets the configuration of components within the subsystem 100. For instance, control data can include, but is not limited to, data that sets the current state of the at least one data selector 104, the at least one counter 114, the at least one address generator 116, and/or data that sets the state of one or more circuit elements within the ALU 108. In some implementations, data, such as control data, transferred via routing 102 can include address data that specifies the address of one or more circuit elements within memory 106. The data transferred on routing 102 can include data that is 16 bits wide, 32 bits wide, 64 bits wide, 128 bits wide, 256 bits, 512 bits wide, or 1024 bits wide, though other data sizes are also possible.

Data is removed from and/or transferred to routing 102 using one or more of the data selectors 104. A data selector 104 can include a circuit element such as a multiplexer that is connected to one or more inputs (e.g., the routing elements) and provides, as an output, data from a selected one of the one or more inputs. A data selector 104 can include a demultiplexer that takes a single input and provides that input onto a selected output (e.g., onto a selected routing element) of multiple possible outputs.

One or more data selectors 104 are coupled to local memory 106 such that data may be transferred to and received from local memory 106. Local memory 106 includes, e.g., random access memory (RAM) such as static random access memory (SRAM). Local memory 106 can be of any size as is sufficient for intended operation of the system. For instance, local memory 106 can be 64 MB, 128 MB, 256 MB, 512 MB, 1024 MB, 2048 MB, among other sizes, and can be a single memory circuit (e.g., single RAM chip) or divided across multiple individual memory circuits (e.g., multiple RAM chips). Local memory 106 can store data that is used in computational operations of the subsystem 100. For instance, local memory 106 can store activation values and/or weight values for use in computations of a neural network layer (e.g., in tensor computations). Local memory 106 can store control data for controlling operation of the various components of subsystem 100. For instance, local memory 106 can store control data that specifies the configuration state for the data selectors 104 (e.g., specifies which input to select or which output to select), control data for the circuit elements of the ALU 108, control data for the address generators 116 (e.g., data that specifies how addresses are generated), and/or control data for the counters 114 (e.g., data that specifies a count value of a counter). In some implementations, the local memory 106 can store full programs (e.g., configuration state data for one or more components of the subsystem 100 over a period of time so that the components operate in a specified manner to achieve a desired outcome).

In contrast to a traditional CPU, in which memory is controlled by having addresses specified either directly or indirectly in the stream of instructions, local memory 106 is written to or read from using addresses generated from one or more of the address generators 116. The particular address generator 116 from which local memory 106 selects an address for reading or writing data can be determined based on a configuration state of the address generator 116 or of memory 106. An address generator 116 includes, e.g., one or more registers, one or more counters, and one or more adder circuits that, together, are configured to generate memory address values that are fed out to one or more selected memory circuits of local memory 106. The address generator 116 follows a state machine to produce an address value, e.g., to produce an address value every cycle of the global or local clock, to produce an address value at one or more multiples of a cycle of the global or local clock, to produce an address value based on a timing of one or more of the counters 114, and/or to produce an address value in response to a trigger event, among other conditions on which generation of an address value can be generated. Configuration data stored in the configuration state registry 112 determines how the address generator 116 will operate. For instance, the configuration data specifies at what value the address generator 116 starts and by how much the addresses generated by the address generator 116 are incremented or decremented.

A counter 114 includes a logical counter (e.g., a circuit element that includes an adder circuit or decrementing circuit and associated register) that can increment or decrement. In some implementations, a counter 114 includes one or more additional values against which a counter value can be compared, such that the counter changes an indicator (also referred to as a trigger event or firing a trigger) when the additional value is reached. Broadly speaking, a counter 114 counts the occurrence of events. For instance, a counter 114 can provide a signal that is valid once per a predefined number of cycles. The number of cycles can be defined by configuration state data. Thus, a counter 114 does not need to step every cycle. A counter 114 can be used by the subsystem 100 to set a cycle period for performing loops. In some implementations, a counter 114 can be used to count events other than cycles. For instance, a counter 114 can be used to count instructions, e.g., instructions received by or sent to control elements within the subsystem 100. A counter 114 can provide a signal that is valid once per a predefined number of instructions. The number of instructions that determine when a counter steps can be defined by configuration state data. Multiple counters 114 can be used to create nested loops. A counter 114 can be coupled to the trigger table registry 110, such that the trigger table registry 110 relies on a value of the counter 114 to determine whether a trigger is fired. Multiple entries of the trigger table registry 110 can be coupled to a single counter 114 as a shared counter. Counters 114 can be coupled to one or more other counters 114 for controlling stepping of the one or more other counters 114. Counters 114 can be coupled to address generators 116 to control incrementing or decrementing of the address generators 116. Counters 114 can have different sizes. The size of the counter determines, for example, how high the counter can count and is determined based on the number of bits allocated to the counter. For instance, subsystem 100 can include 3 small counters (4-bits wide), 2 medium counters (7-bits wide), and 2 large counters (16-bits wide). Other numbers and sizes of counters can be used instead.

The ALU 108 includes circuit elements for performing computational operations, e.g., mathematical operations such as multiply and accumulate operations. In an example, the circuit elements of the ALU 108 are used for performing tensor multiplication. For instance, the circuit elements of the ALU 108 can include multiplier circuitry, adder circuitry, shifters and/or registers arranged in cells. The cells can be arranged in an array, e.g., a systolic array. The array of cells may receive inputs of a neural network layer, such as a tensor including weight inputs, and can perform tensor multiplication using the inputs. Data to be acted on by the cells of the ALU 108 can be retrieved from local memory 106 and data outputs from the cells of the ALU 108 can be stored in local memory 106. Local memory 106 also can include, in some implementations, configuration data that defines the configuration states of the circuit components of the ALU 108. As explained in more detail herein, the configuration data can first be transferred to a configuration state registry before being provided to the circuit components. Data inputs to and outputs from ALU 108 also can be directly obtained from or provided to, respectively, routing 102. In some implementations, the data output from ALU is transferred from subsystem 100 to another subsystem 100 of the overall system or to another component of the system, such as non-local memory 118, computational circuit 120 or vector processing unit 122. Non-local memory 118 can include additional RAM (e.g., SRAM) on the same chip as subsystem 100 or external to the subsystem 100. Computational circuit 120 can include, e.g., a field programmable gate array or other circuit component. Vector processing unit 122 can include, e.g., a scalar processing circuit component for performing scalar mathematical operations on data obtained from the subsystem 100.

During operation of the subsystem 100, data from routing 102 and/or data from local memory 106 is written into trigger table registry 110. Trigger table registry 110 is constructed from multiple registers. Data written to trigger table registry 110 includes control instructions and/or state information for various components of the subsystem 100. Trigger table registry 110 includes multiple entries into which the received data is written. When a trigger for an entry stored in the trigger table registry 110 fires, data in that entry is passed into the configuration state registry 112.

Configuration state registry 112 stores the configuration state data for the components of the subsystem 100. Such configuration state data therefore controls the flow of data within the subsystem 100 and among the components of the subsystem 100, including how to handle data coming into the subsystem 100 from routing 102 and whether data should be transferred to routing 102. Configuration state registry 112 is constructed from multiple registers and stores configuration state information for various components of the subsystem 100. One or more outputs of the configuration state registry 112 are coupled to other components of the subsystem 100 so that when an entry of the configuration state registry 112 is updated, the state of the component to which the entry is coupled will update to reflect the state stored in the configuration state registry 112. The configuration state registry contains, e.g., the current set of control signals for the data selectors 104, read and write operation instructions for the local memory 106, configuration data for registers, and/or control signals for components of the ALU 108. If the configuration data stored in registry 112 does not change, the registry 112 will instruct the subsystem 100 to repeat the exact same operations from cycle to cycle until a change is made. Of course, certain configurations can still lead to changes within a component absent updates to the configuration state such as, e.g., in address generators which contain their own logic for incrementing or decrementing a value on every designated period (e.g., every clock cycle or on every multiple of a clock cycle), without requiring configuration updates.

The components to which the configuration state registry 112 can be coupled included the data selectors 104, local memory 106, counters 114, address generators 116, or ALU 108. In an example, an entry of the configuration state registry 112 is coupled to a first data selector 104 such as a multiplexer. The data stored in the entry of the configuration state registry 112 includes a multiplexer select value. The multiplexer select value is used by the multiplexer to select and place a particular input to the multiplexer on an output of the multiplexer. In another example, an entry in the configuration state registry 112 can be coupled to local memory 106. Data stored in the entry can include configuration data that, when used by the local memory 106, directs the local memory 106 to select a particular address generator 116. In another example, an entry in the configuration state registry 112 can be coupled to a counter 114. Data stored in the entry can include configuration data that sets a value of the counter 114 to which the entry is coupled.

Trigger table registry 110 includes, e.g., a smaller number of entries relative to configuration state registry 112. For instance, trigger table registry 110 can include 16, 32, 64, or 128 entries into which data can be written. The size of configuration state registry 112 can be designed to be as large as the physical register file, e.g., up to about 500 entries in certain contemporary CPU designs.

Thus, in a basic example, local control of subsystem 100 can be implemented as follows. Control data is received at routing 102. The control data includes configuration data specifying a circuit configuration state of a circuit component within the subsystem 100. The circuit component can be, for example, an address generator, a data selector, a counter, or a component of the ALU 108, among other types of components. Depending on a state of a data selector 104 to which the routing 102 is coupled, the control data can be transferred to local memory 106 or to the trigger table registry 110, where the control data is written to an entry in the trigger table registry 110. Subsequent to trigger firing for the entry, the control data (whether from the trigger table registry 110 or from local memory 106) then is written to an entry in the configuration state registry 112. As explained herein, the trigger firing can include, for example, a timer reaching a predetermined number of clock cycles. The output of the configuration state registry 112, which is coupled to a component of the subsystem 100, then updates the state of the component based on the control data to change from a first state to a second state. For instance, the component can be a multiplexor and the output of the configuration state registry 112 can cause the multiplexor to change selection of input data from a first input to a second input.

Figure 2:
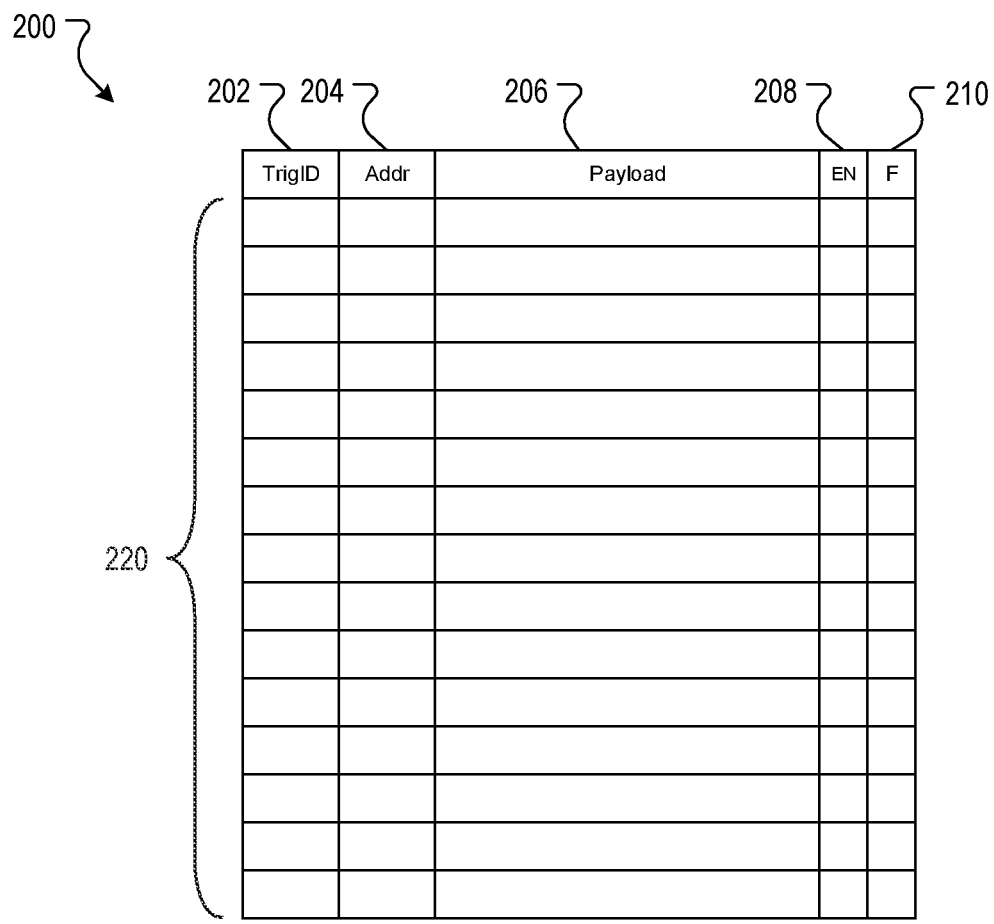
FIG. 2 is a schematic illustrating an example of a trigger table.

FIG. 2 is a schematic illustrating an example of a trigger table 200 that is stored by a trigger table registry, such as registry 110 in FIG. 1. Operation of trigger table 200 will be discussed in the context of the example subsystem 100, but is not limited thereto, and can be applied to other systems that utilize a combination of a trigger table registry and configuration state registry for updating components of the system. Trigger table 200 includes multiple entries 220. As explained herein, each entry can include a configuration state update for a corresponding component of the subsystem 100. The configuration states contained in the entries are transferred to and thus applied to a corresponding component of the subsystem 100 when specific conditions for the entries, respectively, are satisfied. Satisfying a specific condition for a trigger table entry is also referred to as a trigger event or firing a trigger. An example of a trigger event is when a counter reaches a final value (e.g., increments or decrements to a final value). Upon reaching the final value, the condition has been met, and the configuration data in an entry associated with the trigger event is written to the configuration state registry 112.

Each entry in the trigger table 200 can have a specified size. For instance, each entry in the trigger table registry 200 can be 16 bit wide, 32 bit wide, 64 bit wide, or 128 bit wide, among other sizes. The total number of entries in the table 200 can be varied. For instance, the total number of entries within the table 200 can be 16, 32, 64, 128 or 256 entries, among others. Each trigger entry in the trigger table 200 includes multiple fields. For instance, as shown in FIG. 2, each entry of table 200 includes a trigger ID ("TrigID") field 202, an address ("Addr") field 204, a payload field 206, an enable flag ("EN") field 208, and a fired last cycle ("F") field 210. The types of fields included in each entry of the trigger table are not limited to the fields mentioned here and can include different fields or different combinations of fields, including different arrangements of the fields.

Trigger ID field 202 includes data that corresponds to the trigger type for the control data and acts as a pointer to an associated state, e.g., indexes the field to a list of possible triggers and specifies which trigger will be used to determine when the firing condition is met. As an example, in some implementations, the trigger ID field 202 specifies the particular identifier of a first counter out of multiple possible counters. For example, if there are 8 shared counters in the subsystem 100, then the trigger ID field 202 can include a 3-bit number specifying which of the 8 shared counters will determine the firing of the row in the trigger table 200 in which the trigger ID field is located. Data in the address field 204 specifies the particular location within the configuration state registry to which the control data payload should be delivered. Data in the payload field 206 includes the configuration state data that specifies how to configure a component of the subsystem 100. The enable flag field 208 specifies whether the trigger for the entry is currently active. For instance, if the enable flag field 208 is set, then in some implementations, the trigger is characterized as being active and may fire at any time. Data in the fired last cycle field 210 specifies whether or not the trigger for the entry fired within the last cycle. In some implementations, the subsystem 100 includes monitoring circuitry, referred to herein as a "trigger table row state machine," for each row of the trigger table that monitors and updates the relevant trigger state for a corresponding field entry in the trigger table 200, including, e.g., watching the counters (based on trigID), stepping the row-specific counters, checking the enable logic, and updating the "last fired" value, among other actions.

Various types of triggers may be specified by the Trigger ID field 202, each trigger type serving a different corresponding purpose. For example, a first type of trigger is referred to as a constant trigger. A constant trigger is a trigger that always fires or never fires.

A second type of trigger is referred to as an entry counter trigger. An entry counter trigger is a trigger that includes a counter. This counter is part of the trigger table entry and is separate from other counters (e.g., counters 114) that can be included in the subsystem 100. In an example, the trigger ID 202 may include multiple bits, in which one of the bits identifies the trigger as being an entry counter trigger and the remaining bits are used as the counter that increments or decrements. For instance, on each cycle, the counter portion of the trigger ID 202 decrements and, when the counter reaches zero, the trigger for that entry will fire. In some implementations, subsequent to the entry counter trigger firing, the trigger ID 202 is replaced with a constant trigger that never fires, such that the entry counter is a single use counter.

A third type of trigger is referred to as a local trigger. Firing of a local trigger depends on the condition of one or more other entries in the trigger table 200. For instance, an nth entry in the trigger table 200 may fire if one or more other entries (e.g., an n−1 entry) in the trigger table is firing and/or fired within the last cycle. The local trigger would look to the enable flag field 208 or to the fired last cycle field 210 of the other entry to determine whether that trigger fired.

A fourth type of trigger is referred to as a shared counter trigger. A shared counter trigger shares a counter with one or more other entries in the trigger table. The shared counter includes one of the counters 114 and is not a counter formed as part of the trigger table entry. The particular shared counter 114 can be specified in the Trigger ID field 202. The Trigger ID field 202 also can specify the counter value (e.g., the total number of counts or cycles to be counted by the counter). In an example, a shared counter trigger of an nth entry in the trigger table 200 can include, in its payload field, instructions to start a counter shared by the nth entry, the n−1 entry, and the n+3 entry. In this example, the nth entry, the n−1 entry, and the n+3 entry would each include a pointer to the same counter. The multiple trigger table entries do not need to fire at the same time when the shared counter reaches its final value. For instance, in some cases, the different trigger table entries can fire at different times. This can be accomplished, for example, by including a corresponding buffer value against which the shared counter is compared in the Trigger ID field 202. Thus, the buffer value serves to offset the firing of the different triggers that are tied to the same shared counter.

In view of the foregoing, the trigger table can be used to set a defined change in the states of the components of subsystem 100 at defined times based on when the trigger table entries fire. During operation of the subsystem 100, one or more entries of the trigger table then can be updated by a change in one or more states of the configuration settings. For instance, in an example, multiple trigger table entries can include configuration data that, together, specify a counter period and corresponding trigger table entry update that occurs when the counter period is reached. In some implementations, the state of multiple trigger entries can be updated simultaneously. In some implementations, the subsystem 100 can be configured to have a reset state so that the trigger table 200 is reset. That is, at least a first data selector 104 can be configured to default to a state such that, on reset, the at least one data selector 104 accepts data from routing 102 and passes the accepted data to the trigger table 200 as a trigger table entry.

Figure 3:
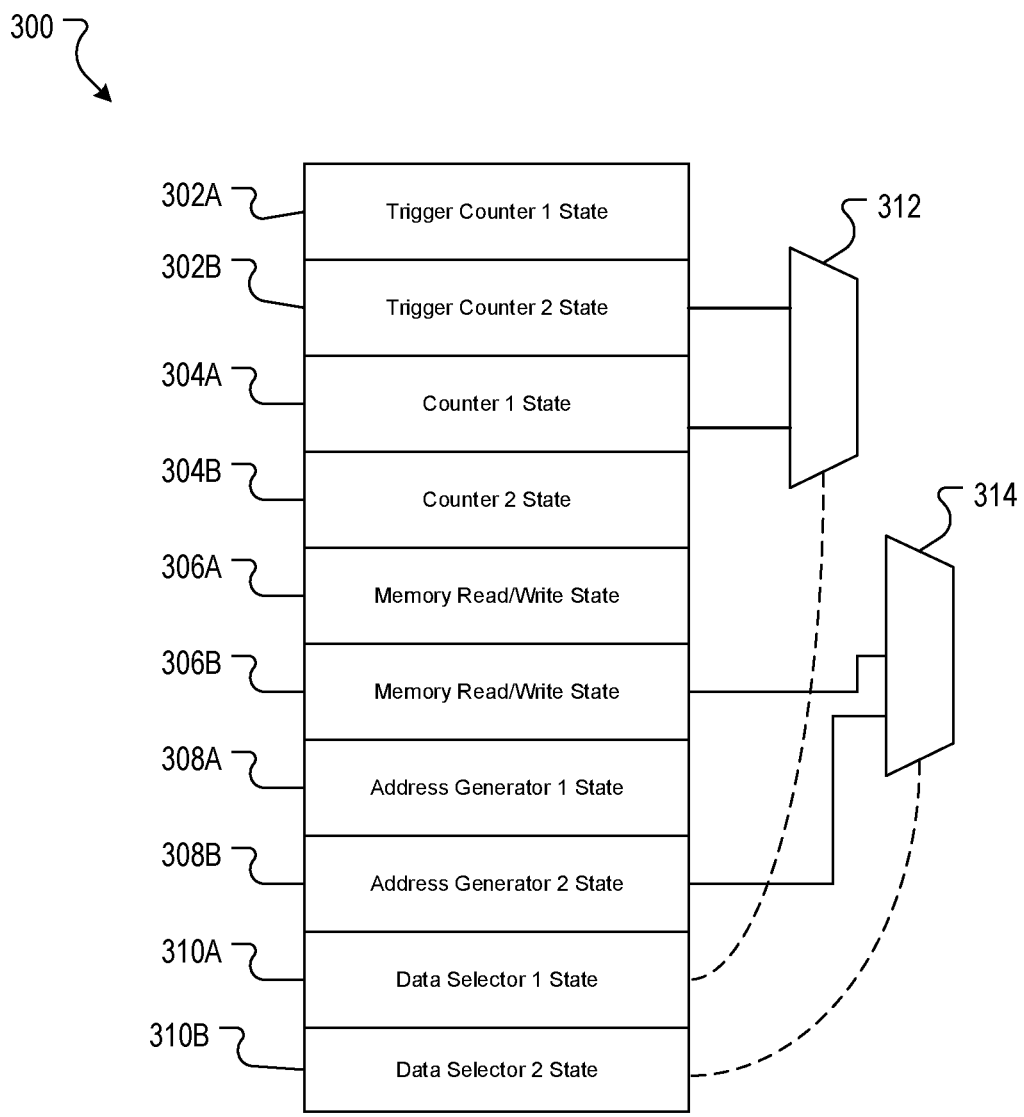
FIG. 3 is a schematic illustrating an example of a configuration state table.

FIG. 3 is a schematic illustrating an example of a configuration state table 300 that is stored by a configuration state registry, such as configuration state registry 112. Operation of configuration state table 300 will be discussed in the context of the example subsystem 100, but is not limited thereto, and can be applied to other systems that utilize a combination of a trigger table registry and configuration state registry for updating components of the systems. The configuration state table 300 includes multiple entries (302-310) that hold state data for various components of the subsystem 100. For instance, as shown in the example of FIG. 3, the configuration state table 300 can include entries that store configuration data for shared trigger counters (e.g., entries 302A, 302B), configuration data for counters (e.g., entries 304A, 304B), configuration data specifying a read or write state for memory elements of local memory 106 (e.g., entries 306A, 306B), configuration data specifying a state of address generators (e.g., entries 308A, 308B), and/or configuration data specifying states of data selectors 104 (e.g., entries 310A, 310B). Other types of configuration data also can be stored by the configuration state table 300.

Each entry of the configuration state table 300 also can have its own address. The address of an entry in the configuration state table 300 can be specified by data stored in an entry in the trigger table, such as trigger table 200. One or more entries of the configuration state table 300 can be tied to one or more components, respectively, of the subsystem 100. As a result, the state of the component can be updated based on the particular configuration state data the component is provided. Thus, on any particular cycle during operation of the subsystem 100, the configuration of components within the subsystem 100 is set according to the configuration data within table 300 for that cycle. If no changes are made to the configuration states stored within table 300 from one cycle to the next, then generally the configuration of components within subsystem 100 also should not change on that next cycle. In some implementations, latching of the configuration states is possible. For instance, in some implementations, a configuration state within a particular entry of the configuration state table 300 can change without causing a change to the present state of a component to which the particular entry is coupled, until, e.g., a next clock cycle or a next multiple of a clock cycle occurs.

Optionally, in some implementations, the configuration state of the subsystem 100 is "banked." That is, one of multiple possible settings can be the current active configuration state for a component and can be stored in the configuration state table. To choose the current configuration state, different possible entries of the configuration state table are provided as inputs to data selectors, the state of which also can be determined by the configuration state table 300. An example of this is shown in FIG. 3, where entries 302B and 304A are provided as inputs to data selector 312. The state of data selector 312, and thus the particular output selected, is determined by the entry 310A. Similarly, entries 306B and 308A are provided as inputs to data selector 314, where the state of data selector 314 is determined by entry 310B. Other configurations for creating banked states are also possible and are not limited by the example shown in FIG. 3. Banked states act as spare program storage for programs running in the subsystem 100. Without banked states, certain implementations would require all state updates to be stored in the trigger table registry, thus requiring an increase in size and reducing the storage efficiency of the system.

Figure 4:
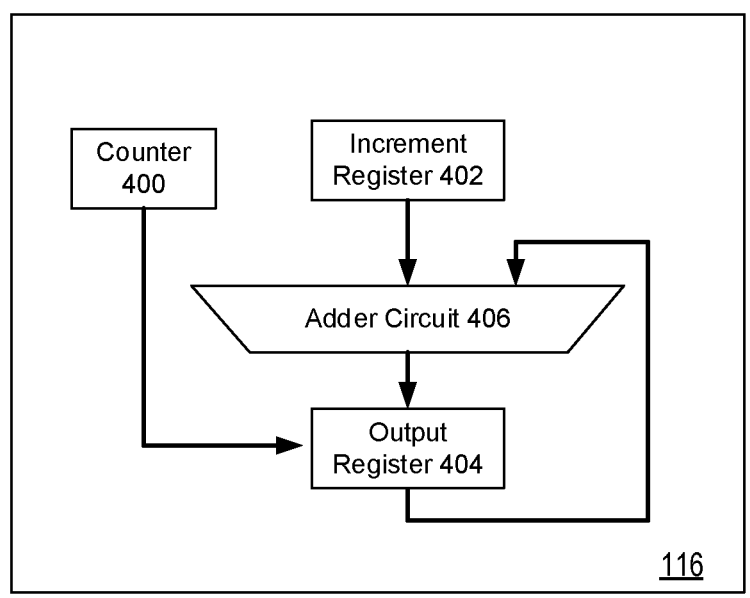
FIG. 4 is a schematic illustrating an example of an address generator.

An example of an address generator that can be used as generator 116 is shown in FIG. 4 and includes a counter 400 that increments by an integer value of 1, a first register 402 to store an increment value of the address generator 116, a second register 404 to store the address generator output, and an adder circuit 406 to add the increment value of register 402 to the output of the register 404. The counter 400 is coupled to the output register 404 to act as a clock gate. Thus, the counter 400 can conditionally prevent the output register 404 from being updated on some clock cycles. Thus, every time the counter 400 fires, the address output value stored in the second register 406 is updated. The state of the address generator 116 shown in FIG. 4 thus can be defined by the increment value used in the first register 402, the firing pattern for the counter 400, and the value of the output register 404. The state of an address generator 116 can be written to and read from memory, if needed. The address generator structure shown in FIG. 4 is just an example and other address generator structures can be used instead of or in addition to the structure shown for address generators 116. In some cases, the address generator 116 can include flag registers that are updated upon the firing of a particular trigger. For example, in some implementations, the address generator 116 can include an increment flag register that instructs the counter of the address generator 116 to increment when a corresponding trigger (e.g., from the trigger table) is fired but will prevent the counter from incrementing when no corresponding trigger is fired. In some implementations, the address generator 116 can include a zeroing flag register that causes the counter 400, the value in the first register 402, the value in the second register 404 or a combination of all three, to reset when a corresponding trigger (e.g., from the trigger table) is fired but will not alter those values when no corresponding trigger is fired. Other flag registers area also possible. In some implementations, the address generator 116 can include an offset generator that modifies a value of the offset in the first register 402. Rather than define the offset value in the configuration state registry 112, an offset generator provided as part of the address generator 116 can be useful when loops are performed, as it reduces the number of updates needed to the configuration state registry 112. An offset generator can include, e.g., another counter that increments periodically (e.g., every cycle or every other cycle), where the output of the counter modifies an offset value. The state information for the offset generator can be set in the configuration state registry 112 and stored in memory.

An advantage, in certain implementations, of the present techniques is that a unified local memory device that stores both program instructions (e.g., configuration data that specifies the configuration states of the circuit components) and data to be acted on by the circuit components can be provided. An example of a basic implementation of this is provided as follows. The process can be performed by a circuit device, such as subsystem 100, that includes a local memory unit and an address generator. The process includes, e.g.: generating, by the address generator, a first address; obtaining, based on the first address, a first data value from the local memory unit; providing the first data value to a first circuit element of the circuit device; generating, by the address generator, a second address; obtaining, based on the second address, first configuration data from the local memory unit; and configuring the first circuit element to be in a first state based on the first configuration data so as to act on the first data value, wherein the first circuit element is configured to be in the first state at a same time that the first data value is provided to the first circuit element. When reading from or writing to memory, it may be necessary to select a particular address generator since the subsystem can include multiple address generators. Selecting an address generator can include, e.g., configuring the "address generator ID" configuration bits associated with the memory to be equal to the address generator in question, for example setting the "address generator ID" configuration bits to "3" to specify that the 3rd address generator will be used. Other techniques for selecting an address generator are also possible.

Figure 5:
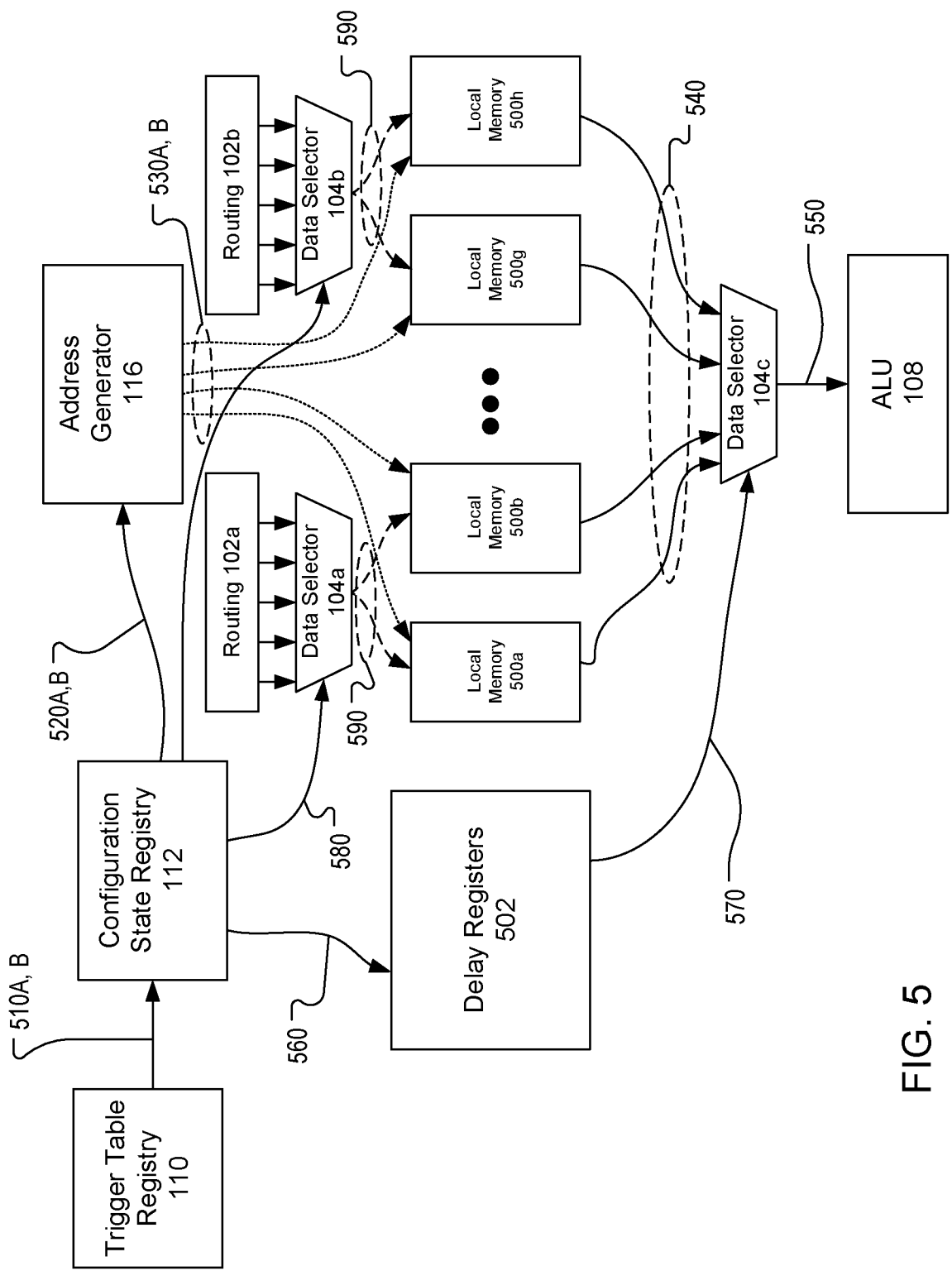
FIG. 5 is a schematic illustrating an example of address generation for reading and writing data to memory of a subsystem of a machine-learning system.

FIG. 5 is a schematic illustrating an example of address generation for reading and writing data to memory of a subsystem of a machine-learning system, such as the subsystem 100. Reading data from and/or writing data to memory of the subsystem requires ensuring that data selectors, registers, routing, among other components required for shuttling data are properly configured by the time data reaches those components. Furthermore, to ensure the data is written to the correct location in memory or read from the correct location in memory, the proper address should be generated and selected from the address generator.

In some implementations, there is a latency associated with reading data from memory. For instance, there may be 1-4 clock cycles of delay between the output of an address register being provided to a memory circuit and data from the memory circuit being placed on an output register of the memory. To account for this latency, delays can be applied to control data that sets the configuration state of components along the data path between the memory circuit being read and the destination circuit element for the data. Adding these delays is referred to as pipelining.

An example of pipelining is shown in FIG. 5. As explained herein, upon firing of the appropriate trigger, control instructions from trigger table registry 110 are passed (510A) to the configuration state registry 112 to update the configuration state for the subsystem. In a next cycle, updated configuration state data can include control instructions passed (520A) to address generator 116. Control instructions can include, e.g., identification of a particular address generator of multiple address generators, instructions for setting a starting address of the address generator 116, and/or instructions for incrementing or decrementing addresses generated by address generator 116, among other instructions. Once an address is generated, the address is provided (530A) in a next cycle to local memory 500. In the present example, local memory can include multiple memory circuits 500a, 500b, . . . , 500g, 500h. Each memory circuit 500 can include, e.g., a different RAM memory circuit, such as synchronous RAM (SRAM), with multiple addressable memory locations. In the present example, the same address is provided to each memory circuit 500 for a read operation such that, at each memory circuit, data stored in the specified address is accessed and, e.g., placed on a corresponding memory output register. The data thus read from memory circuits 500 are passed (540) in a next cycle to a data selector, such as data selector 104c. Given that generating the address and obtaining data from memory 500 can take multiple cycles, the control instructions for operating data selector 104c should be timed to arrive at the data selector 104c when the data output from the memory circuits 500 arrives at the data selector 104c. To adjust the timing as to when the data selector control instructions arrive, the control instructions can be passed (560) from the configuration state registry 112 through one or more delay registers 502 prior to reaching the data selector 104c. For example, to compensate for a 4 cycle delay between when an address is generated and data is read out from memory 500 to data selector 104c, the data selector control instructions can be passed through 4 serially arranged delay registers, each of which applies a 1 cycle delay to the control instructions. The number of delay registers can be set based on the expected delay for reading data from memory and how long of a delay each register applies. For instance, delay registers can be configured to apply greater than 1 cycle delay, such as a 2 cycle, 3 cycle, or 4 cycle delay. Although certain operations are described herein as requiring one cycle, different time periods may be required for a step to be completed. For instance, operations described herein may require more than one cycle including, e.g., 2 cycles, 3 cycles, or 4 cycles. Once the data selector control instructions are passed (570) to the data selector 104c, selected data then is passed (550) to the ALU 108. The data read process as described above is configured to begin execution in a single cycle. That is, the control instructions are passed (520A, 560) from the configuration state registry 112 to their respective subsystem components in a same cycle. Having a read process begin execution in a single cycle can simplify designing the configuration state changes in certain implementations. Alternatively, the data read process can be configured to spread out execution over multiple cycles. For instance, the configuration state registry 112 can be configured to set control instructions for the address generator 116 on a first cycle, and then can be configured to set control instructions for the data selector 104c at a later point in time, such as 4 cycles later to accommodate the read delay so the data selector 104c operates on the received data at the appropriate time. Such configuration can be achieved by appropriately setting triggers in the trigger table 110. In this way, delay registers 502 do not need to be used.

Also shown in FIG. 5 is a memory write process. The data write process also can be configured to execute in a single cycle. For instance, upon firing of the appropriate trigger, control instructions from trigger table registry 110 are passed (510B) to the configuration state registry 112 to update the configuration state for the subsystem. The control instructions can include instructions for the address generator 116 as well as instructions for setting the state of data selectors 104a, 104b. In a next cycle, the control instructions for the address generator 116 are passed (520B) from the configuration state registry 112 to address generator 116. Such control instructions can include, e.g., identification of a particular address generator of multiple address generators, instructions for setting a starting address of the address generator 116, and/or instructions for incrementing or decrementing addresses generated by address generator 116, among other instructions. Once an address is generated, the address is provided (530B) in a next cycle to local memory 500. As explained herein, local memory can include multiple memory circuits 500a, 500b, . . . , 500g, 500h, and the same address can be provided to each memory circuit 500 for a write operation such that, at each memory circuit, data is stored in the specified address location.

Data to be written to memory can come from routing 102 of the subsystem. For instance, multiple different routing bus lines (102a, 102b) can be coupled to each data selector (e.g., data selectors 104a, 104b) of the subsystem. Upon receiving (580) configuration data from the configuration state registry 112, the data selectors (104a, 104b) are set to select data from the multiple routing bus lines (102a, 102b) and then pass (590) the selected data to the address locations in memory 500 specified by the generated address of address generator 116. Although no delay registers are shown in FIG. 5 for a write process, the subsystem can be configured to include delay registers to perform pipelining to accommodate delays in generating memory addresses, similar to the read process described herein.

Because of practical limitations, the size and number of certain components within the subsystem (e.g., the size of the trigger table registry, the size of the configuration state registry, the number of counters, and the number of address generators) is limited. For example, in some implementations, a subsystem can be limited to a trigger table registry having no more than 16 entries, no more than 10 counters, and no more than 9 address generators. As a result, applications above some threshold complexity will be too large to store and run across these limited resource constraints. For such programs, data such as, e.g., trigger table entries and configuration data can be stored in the local memory of the subsystem, in memory external to the subsystem but still part of the larger system, or in memory external to the system (e.g., from field programmable gate arrays and/or dynamic RAM via a Serializer/Deserializer). Similarly, the state of a counter and/or address generator of the subsystem can be stored and loaded from any of the same foregoing memory sources. By using these other memory components, in place of registers, to store configuration data and state data, the size of a program that can be run by the subsystem can be greatly expanded. For instance, in some implementations, memory in a single subsystem can be configured to store between 1,000-5,000 trigger table entries, between 1,000-10,000 trigger table entries, between 1,000-15,000 trigger table entries, or between 1,000-20,000 trigger table entries, among others. Similarly, memory in a single subsystem can be configured to store configuration data for between 100-1,000 counters, between 100-2,500 counters, between 100-5,000 counters, between 100-7,500 counters, or between 100-10,000 counters, among others. Similarly, memory in a single subsystem can be configured to store configuration data for between 100-1,000 address generators, between 100-2,500 address generators, between 100-5,000 address generators, between 100-7,500 address generators, or between 100-10,000 address generators, among others. Remote memory (e.g., memory outside the subsystem or external to the system) can be configured to store multiples of the foregoing values, such as, e.g., by a factor of 10, 100, 500, 1000, 1500, 2500, or 5000, among other multiples.

In the case of loading configuration data for states that are invariant (e.g., loop-invariant), a compiler for the system can load any loop-invariant data from the corresponding memory in which the data is stored by inserting the relevant configuration updates into the trigger table. However, in addition to configuration states, which may be loop-invariant, applications may utilize loop-varying (also referred to as "dynamic") data. Examples of dynamic data includes counter values output by the counters and address values output by the address generators.

To load all loop-varying states for a loop from memory into the control hardware of the subsystem using updates to the trigger table registry and configuration state registry would require that the memory contain the entire unrolled loop, which is applicable to a limited number of cases that do not consume more memory than is available, e.g., in the subsystem for the program or programs to be stored in memory.

An alternative is to temporarily store dynamic data (generated, e.g., by a counter or address generator) into memory (as opposed to maintaining the dynamic data in individual registers associated with the counter or address generators), where such dynamic data can later be read and loaded back into the control hardware. Performing temporary storage of loop-varying states can be used to avoid storing an entire unrolled loop. Alternatively, all of the configuration data characterizing the state of the component that produces the dynamic data (e.g., the address generator or counter) can be stored in memory for reading out at a later time.

A basic example of how the devices disclosed herein can be used to implement loops is provided as follows, in which a circuit element's configuration state for each iteration of a loop is stored in a local registry table. The example is described with respect to subsystem 100 but is applicable to other systems that utilize local registry tables for storing configuration state data. For instance, in some implementations, configuration state data for at least one control element, for multiple iterations of a loop, is stored across multiple entries of a configuration state registry (e.g., registry 112). That is, e.g., each entry of the multiple entries can include data that corresponds to a different configuration state for a control element. The control element can include, e.g., a data selector, such as a multiplexor or demultiplexor, where the different configuration states can specify which input to select in the case of a multiplexor or which output to select in the case of a demultiplexor. In other examples, the circuit element can include an address generator, a counter, or other circuit component, such as a circuit component in the ALU 108, where the different configuration states can specify the particular operating state of those components.

As explained herein, the configuration state data can be transferred into registry 112, in some implementations, from trigger table registry 110. In a simple loop, an address generator can be configured to generate and cycle through the loop indexes, e.g., incrementing an index to a new value on each cycle of a clock (or, alternatively, on a every predetermined multiple of a clock cycle).

The following is an example of a loop that can be implemented by the subsystem of the present disclosure (e.g., the subsystem of FIG. 1), in which a counter is configured to iterate the parameter k:

```
for k = 1 to 3:
    address = 10*k
        <use address to select entry in registry 112 from
        which configuration state data
    for circuit element is to be obtained>
        <output control data next phase of the program>
```

A first address generator A stores the value 10*k. Upon each iteration of the loop, the value k, and thus the address, is updated. The update address is used to select an entry in the local registry (e.g., the configuration state registry 112) from which the configuration state data for a circuit element is to be obtained for the present iteration of the loop. Upon selection, the configuration state data is passed to the circuit element to change an operating state of the circuit element.

As explained herein, in some implementations, dynamic data (generated, e.g., by a counter or address generator) can be temporarily stored in memory, such as local memory 106, as opposed to maintaining the dynamic data in individual registers. The dynamic data then can be read and loaded back into the control hardware at a later point in time. In some implementations, this process can be useful especially in cases where a program is configured to run a set of nested loops (e.g., an inner loop and an outer loop that iterates when the inner loop rolls over).

In an example implementation, the subsystem may include a sufficient number of registers to store the counter values for each iteration of an inner loop of a nested loop, but not for the iterations of the outer loop. In such a case, the iteration value of the outer loop may be temporarily stored in memory and updated on each iteration of the outer loop. Since the state for outer loops is accessed rarely, the associated instructions for storing and loading the dynamic values may have negligible impact on performance of the system.

The following is an example of a 3-loop nested loop that can be implemented by the subsystem of the present disclosure (e.g., the subsystem of FIG. 1):

```
for i = 1 to 10:
    for j = 1 to 10:
        for k = 1 to 3:
            address = 100 * i + 10 * j + k
            <use address for memory read or write>
    <next phase of the program>
```

Without temporarily storing iteration values, the foregoing nested loop can be implemented using three address generators and three counters: a first address generator A to store the value k; a second address generator B stores the value 10*j; a third address generator stores the value 100*I; a summing circuit combines the output of address generators A, B, and C to produce the address output 100*i+10*j+k every cycle. Similarly, a first counter D would generate the iteration value k, a second counter E would generate the iteration value j, and a third counter F would generate the iteration value i. When Counter D wraps around to 1 after reaching a value of 3, the second address generator B increments by 10. When second counter E wraps around to 1 after reaching a value of 10, the third address generator C increments by 100 and the address value produced by the summand circuit is used to read or write to memory. When third Counter F wraps around to 1 after reaching the value 10, the program loads <next phase of the program>.

Configuring a subsystem, such as subsystem shown in FIG. 1, to temporarily move dynamic data (or all of the configuration state data for the component that produces the dynamic data) to memory can reduce the number of address generators and counters that are used to perform a nested loop. For instance, in the foregoing example, the iteration value of the outer loop (which is constant while the inner two loops iterate from 1 to 10 and from 1 to 3, respectively) can be stored in memory rather than stored in a register of the first address generator, thus freeing the first address generator for other purposes or allowing the subsystem to be designed with fewer address generators altogether. When the inner loops iteration values wrap around, the outer loop iteration value (and/or the configuration state data of the address generator) can be read from memory to update the present state of the third address generator. Similarly, the iteration value of the middle loop (which is constant while the innermost loop iterates from 1 to 3) can be stored in memory rather than in the second address generator. Likewise, less frequently changed counter values can be stored temporarily in memory, thus freeing counters for other purposes or allowing the subsystem to be designed with fewer counters altogether.

An example process that can be performed by the systems disclosed herein and that utilizes loops includes matrix multiplication. In a matrix multiplication, weight values are loaded into a systolic array of cells located, e.g., in the ALU 108, each cell containing a multiple-accumulate circuit for performing a multiply and add operation. After loading the weight values, the cells can, e.g., perform a multiply-accumulate operation using the weight for that cell and a corresponding activation value that is shifted into the cell.

For instance, in advance of the matrix multiplication operation, weight values can be scheduled to arrive on routing at subsystem 100. When the weight values arrive, the data selectors 104 can be configured through the trigger table registry 110 and the configuration state registry 112, as described herein, to select the incoming data from other routing and pass the selected incoming data to local memory 106. This may be done using a loop operation where, at every cycle, an address generator 116 increments a memory address to which weight values from the selected routing 102 are stored. After the weights are all transferred into memory 106, a new trigger fires (e.g., after a counter reaches a threshold value), updating the configuration state registry 112 to disable writing to memory 106.

Subsequently, during the matrix multiply operation, the weight data is retrieved from memory 106 and passed to the ALU 108. The weight data can be used, e.g., as part of the matrix multiply operation for a predetermined number of cycles, such as for every 16 cycles. That is, for each cycle of 16 consecutive cycles, the same weight data retrieved from memory is used in a multiply-accumulate operation with activation values obtained from routing 102. To read the weight data, a new trigger is fired in the trigger table registry 110, which updates the configuration state registry 112 to configure an address generator 116 for providing read addresses to memory. The weight data then is read from memory 106 based on the addresses specified by the address generator 116. The configuration state data can configure the address generator 116 to increment every 16 cycles such that a new set of weight values is transferred into the ALU 108 at the end of the 16 cycles.

Similarly, during the matrix multiply operation the activation values shifted into the ALU 108 can be changed on every cycle. For instance, the trigger table registry 110 can include a trigger that fires and causes the data selector 104 to select a particular routing bus line on which activation data is present and to pass that activation data to the ALU 108 where the activation data is shifted into cells of the ALU 108 for the matrix multiple operation. At each subsequent cycle, a new activation value may be shifted into the ALU 108 from the selected routing bus.

Figure 6:
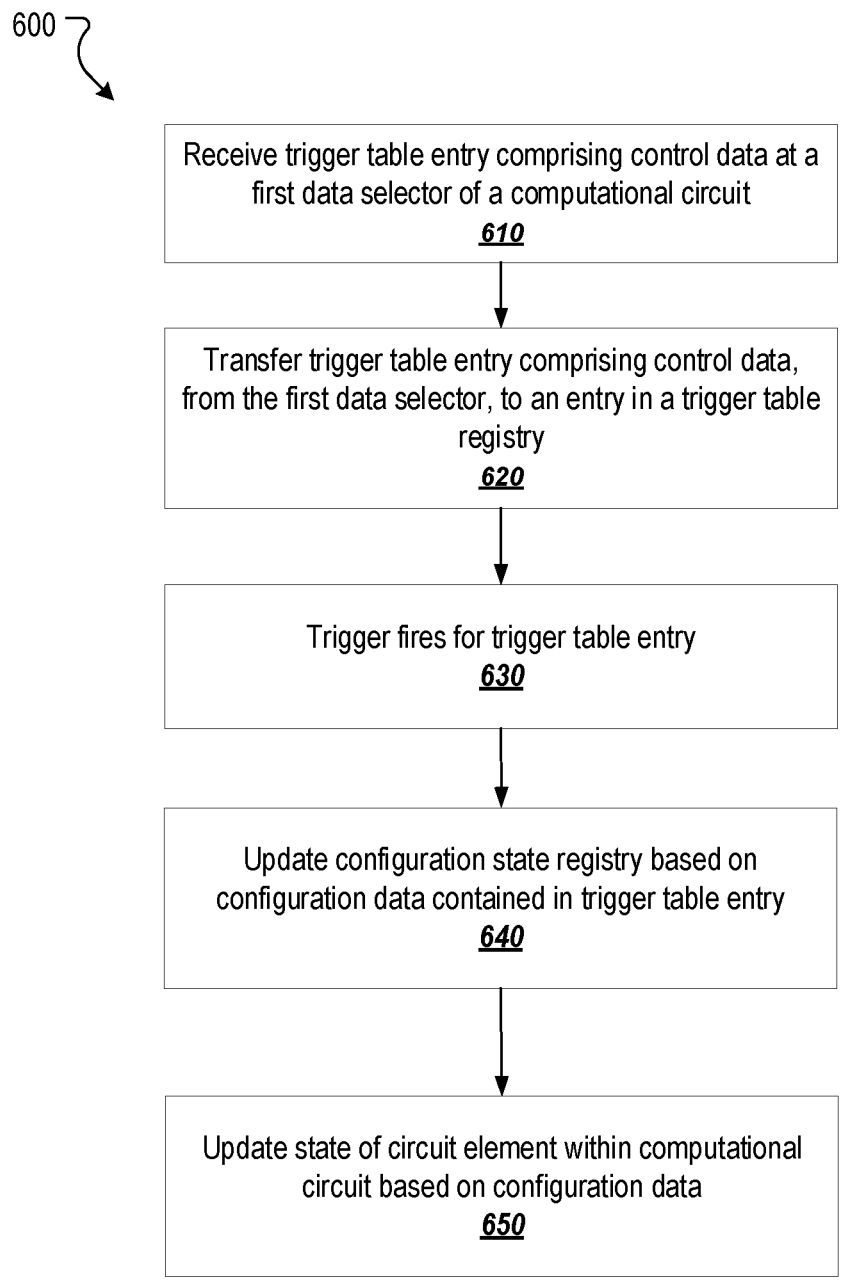
FIG. 6 is a flow chart illustrating an example of a process of updating a configuration state of a subsystem of a machine-learning system.

FIG. 6 is a flow chart that illustrates an example process 600 for controlling a machine-learning system according to the present disclosure, and will be described with respect to the subsystem 100 of FIG. 1, though it can apply to other machine-learning systems as well. The process 600 can be used to configure the state of various components within the subsystem 100. In a first step (610), a trigger table entry that includes control data is received at a data selector (e.g., data selector 104) from routing 102. The data selector 104 can already be configured to be in a state to receive and select data from a particular routing bus line of routing 102 when the trigger table entry arrives. The control data can include configuration state data for setting a configuration of a component within the subsystem 100.

The trigger table entry can be passed from the data selector 104 to an entry of the trigger table 110. For example, the incoming data can be bundled with bits specifying which index of the trigger table to write to. A trigger for the trigger table entry then can fire (630). The trigger can fire based on a counter associated with the trigger table entry reaching a predetermined threshold or by another trigger event as described herein. Subsequent to the trigger firing, the corresponding trigger table entry passes configuration state data for that trigger entry to the configuration state registry 112, where the configuration state registry 112 is updated (640) based on the received configuration state data. A state of a circuit element (e.g., a data selector 104, an address generator 116, or a counter 114) within the subsystem 100 then can be updated (650) based on the configuration data. The update to the circuit element can occur on the cycle immediately following receipt of the configuration state data or some cycle thereafter.

Figure 7:
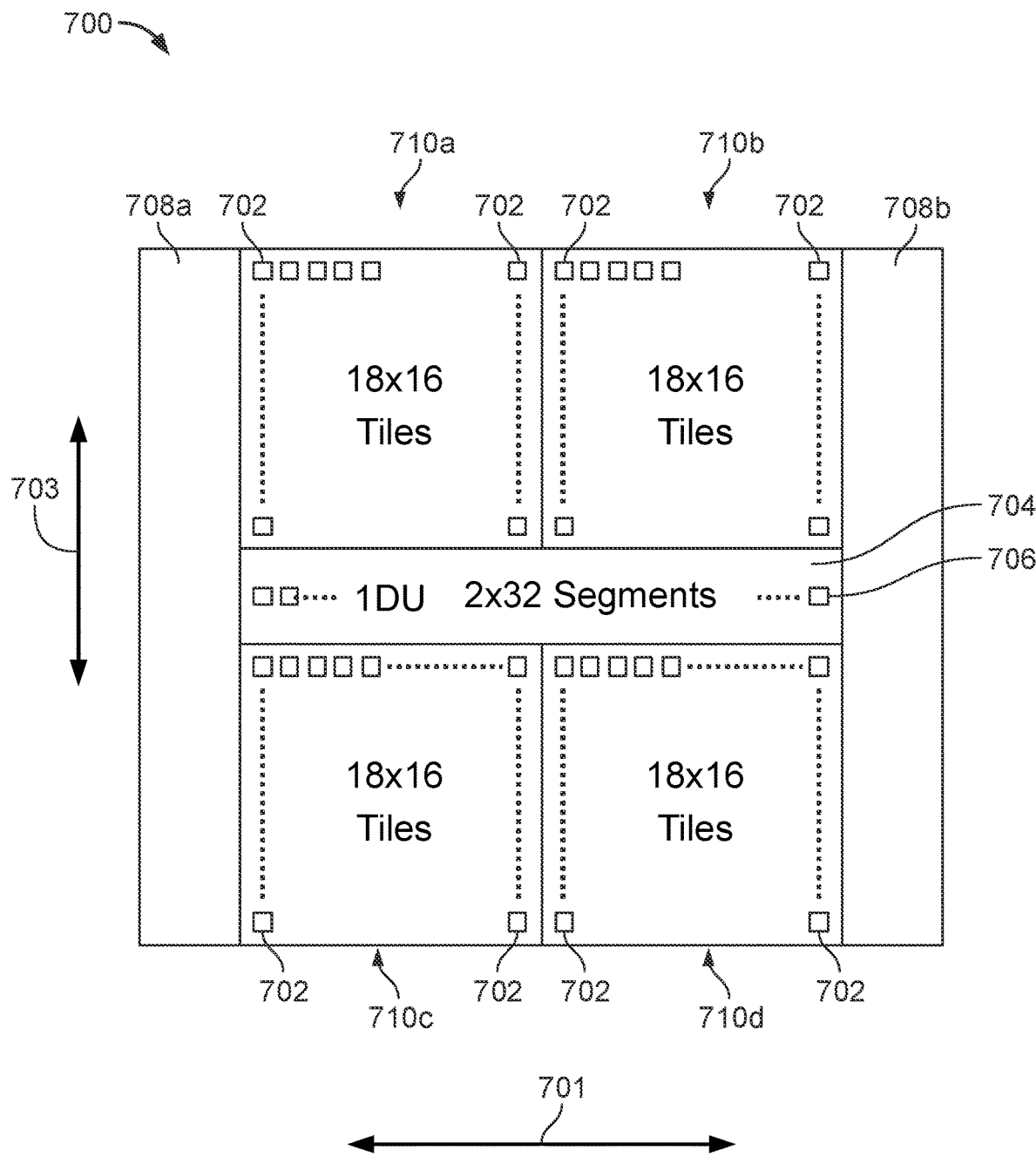
FIG. 7 is a schematic illustrating an example of special purpose logic circuitry.

FIG. 7 is a schematic that illustrates an example of special purpose logic circuitry. The special logic circuitry 700 can be part of a machine-learning system and includes multiple synchronous subsystems that for brevity will be referred to as tiles. For example, the special logic circuitry 700 includes tiles 702, in which one or more of the tiles 702 includes special purpose circuitry (e.g., trigger table registry, configuration state registry, address generators, counters, routing bus lines, data selectors, registers, multiply circuitry, adder circuitry, shifters, and/or memory, among other types of circuitry, such as described herein) configured to perform synchronous computations, such as e.g., multiplication and addition operations. In particular, each tile 702 can include a computational array of cells, in which each cell is configured to perform mathematical operations (see, e.g., the components of exemplary tile 100, including ALU 108, shown in FIG. 1, and described herein). In some implementations, the tiles 702 are arranged in a grid pattern, with tiles 702 arranged along a first dimension 701 (e.g., rows) and along a second dimension 703 (e.g., columns). For instance, in the example shown in FIG. 7, the tiles 702 are divided into four different sections (710a, 710b, 710c, 710d), each section containing 288 tiles arranged in a grid of 18 tiles down by 16 tiles across.

The special logic circuitry 700 also includes a vector processing unit 704. The vector processing unit 704 includes circuitry configured to receive outputs from the tiles 702 and compute vector computation output values based on the outputs received from the tiles 702. For example, in some implementations, the vector processing unit 704 includes circuitry (e.g., trigger table registry, configuration state registry, address generators, counters, routing bus lines, data selectors, registers, multiply circuitry, adder circuitry, shifters, and/or memory, among other types of circuitry) configured to perform accumulation operations on the outputs received from the tiles 702. Alternatively, or in addition, the vector processing unit 704 includes circuitry configured to apply a non-linear function to the outputs of the tiles 702. Alternatively, or in addition, the vector processing unit 702 generates normalized values, pooled values, or both. The vector computation outputs of the vector processing units can be stored in one or more tiles. For example, the vector computation outputs can be stored in memory uniquely associated with a tile 702. Alternatively, or in addition, the vector computation outputs of the vector processing unit 704 can be transferred to a circuit external to the special logic circuitry 700, e.g., as an output of a computation. In some implementations, the vector processing unit 704 is segmented, such that each segment includes circuitry configured to receive outputs from a corresponding collection of tiles 702 and computes vector computation outputs based on the received outputs. For instance, in the example shown in FIG. 7, the vector processing unit 704 includes two rows spanning along the first dimension 701, each of the rows including 32 segments 706 arranged in 32 columns. Each segment 706 includes circuitry (e.g., trigger table registry, configuration state registry, address generators, counters, routing bus lines, data selectors, registers, multiply circuitry, adder circuitry, shifters, and/or memory, among other types of circuitry) configured to perform a vector computation, as explained herein, based on outputs (e.g., an accumulated sum) from a corresponding column of tiles 702. The vector processing unit 704 can be positioned in the middle of the grid of tiles 702 as shown in FIG. 7. Other positional arrangements of the vector processing unit 704 are also possible.

The special logic circuitry 704 also includes a communication interface 708 (e.g., interfaces 708a, 708b). The communication interface 708 includes one or more sets of serializer/deserializer (SerDes) interfaces and a general purpose input/output (GPIO) interface. The SerDes interface is configured to receive instructions (e.g., instructions for operating controllable bus lines described below) and/or input data for the special logic circuitry 700 and to output data from the special logic circuitry 700 to an external circuit. For example, the SerDes interface can be configured to transmit instructions and/or input data at a rate of 32 Gbps, 56 Gbps, or any suitable data rate over the set of SerDes interfaces included within the communications interface 708. The GPIO interface is configured to provide an interface for debugging and/or bootstrapping. For example, the special logic circuitry 700 may run a boot program when it is turned on. If the program fails, an administrator may use the GPIO interface to debug the source of the failure.

Embodiments of the present subject matter have been described with the use of trigger tables to provide unified mapping from events (e.g., counters reaching zero or other values) to state changes. However, other embodiments are also possible in which trigger tables are not employed. For instance, a more distributed mapping can be implemented in which one or more counters are only able to induce changes in particular states. For instance, a counter can be tied to a particular bit state with no mapping (e.g., a counter can be tied to a particular configuration register or to a particular circuit element input, where the value stored by the register or present on the input updates upon the counter trigger event).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. Elements of a computer can include a central processing unit for performing or executing instructions and one or more memory devices for storing instructions and data. The central processing unit and the memory can be replaced with, supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method performed by a computational circuit comprising
a memory device, a plurality of data selectors, at least one counter, a trigger table registry, and a configuration state registry comprising a plurality of registers, wherein the trigger table registry has a smaller number of entries relative to the configuration state registry, the method comprising:
receiving control data at a first data selector of the plurality of data selectors, wherein the control data comprises (i) a configuration registry address specifying a location in the configuration state registry and (ii) configuration data specifying a circuit configuration state of a circuit element of the computational circuit, wherein the circuit element is coupled to the configuration state registry;
transferring the control data, from the first data selector, to an entry in the trigger table registry;
responsive to a first trigger event occurring, transferring the configuration data to the location in the configuration state registry specified by the configuration registry address; and
updating a state of the circuit element based on the configuration data.

2. The method of claim 1, wherein the circuit element comprises a first data selector, a first counter, a first address generator, or a first memory element of the memory device.

3. The method of claim 1, wherein the computational circuit is a component of a machine-learning accelerator.

4. The method of claim 1, wherein the control data comprises a trigger ID, wherein the trigger ID comprises a trigger ID counter, and wherein the method further comprises iterating a change in a value of the trigger ID counter until a predetermined counter value is obtained, wherein the first trigger event comprises the trigger ID counter reaching the predetermined value.

5. The method of claim 1, wherein the entry in the trigger table comprises an enable flag that indicates whether the entry is active or inactive.

6. The method of claim 1, wherein the entry in the trigger table comprises a fired flag that indicates whether a trigger event for the entry occurred within a previous clock cycle.

7. The method of claim 1, wherein the first trigger event comprises a transfer, during a previous clock cycle, configuration data from another entry in the trigger table registry to the configuration state registry.

8. The method of claim 1, wherein the first trigger event comprises a first counter of the at least one counter reaching a predetermined value.

9. The method of claim 8, wherein, responsive to the first trigger event occurring, transferring configuration data from another entry in the trigger table registry to the configuration state registry.

10. The method of claim 1, wherein the configuration data identifies a first address generator from which a first memory element of the memory device selects a memory address for reading or writing.

11. The method of claim 1, wherein the computational circuit comprises an arithmetic logic unit comprising an array of multiply-accumulate cells.

12. A computational circuit comprising:
a memory device;
a plurality of data selectors;
at least one counter;
a trigger table registry; and
a configuration state registry comprising a plurality of registers and coupled to the memory device, to the plurality of data selectors, and to the at least one counter, wherein the trigger table registry is configured to pass configuration data stored in one or more entries of the trigger table registry to the configuration state registry upon the occurrence of one or more trigger events, wherein the configuration state registry specifies a state of one or more of the memory device, the plurality of data selectors, and the at least one counter, and wherein the trigger table registry has a smaller number of entries relative to the configuration state registry.

13. The computational circuit of claim 12, wherein the computational circuit is a component of a machine-learning accelerator.

14. The computational circuit of claim 12, wherein the trigger table registry comprises a plurality of entries, and wherein each entry of the plurality of entries stores control data comprising a corresponding (i) configuration registry address specifying a location in the configuration state registry and corresponding (ii) configuration data specifying a circuit configuration state of a circuit element of the computational circuit.

15. The computational circuit of claim 14, wherein each entry of the plurality of entries stores a corresponding trigger ID, wherein the trigger ID of at first entry of the plurality of entries comprises a trigger ID counter that signals, upon reaching a predetermined value, a corresponding trigger event for the first entry.

16. The computational circuit of claim 14, wherein each entry of the plurality of entries stores a corresponding enable flag that indicates whether the entry is active or inactive.

17. The computational circuit of claim 14, wherein each entry of the plurality of entries stores a fired flag that indicates whether a trigger event for the entry occurred within a previous clock cycle.

18. The computational circuit of claim 12, wherein a first entry of the configuration state registry and a second entry of the configuration state registry are coupled as a first input and a second input, respectively, to a first data selector of the plurality of data selectors, and wherein a third entry of the configuration state registry is coupled to a control input of the first data selector.

19. The computational circuit of claim 12, wherein a first entry of the configuration state registry is coupled to at least one address generator of the computational circuit, wherein an output of the at least one address generator is coupled to at least one memory element of the memory device, and wherein the output of the at least one address generator provides a memory address.

20. The computational circuit of claim 12, wherein the computational circuit comprises an arithmetic logic unit that includes an array of cells, each cell configured to perform a multiply and accumulate operation.

21. A method for performing control operations, the method comprising:
    setting a first control element of a first circuit device in a first state;
    initiating a timer to count a predetermined number of clock cycles; and
    responsive to the timer counting the predetermined number of clock cycles, updating the first control element to a second state, wherein updating the first control element comprises transferring configuration data from a configuration state registry to the first control element, wherein the configuration state registry comprises a plurality of predefined configuration states for a plurality of control elements of the first circuit device,
    wherein setting the first control element of the circuit device in the first state comprises firing a first trigger for a first trigger table entry in a trigger table registry so that a first configuration state entry of the configuration state registry is updated to include first predefined configuration state data from the trigger table, wherein the trigger table registry has a smaller number of entries relative to the configuration state registry.

22. The method of claim 21, wherein setting the first control element of the circuit device in the first state comprises transferring first predefined configuration state data from the configuration state registry to the first control element.

23. The method of claim 22, wherein the configuration data comprises second predefined configuration state data, and wherein updating the first control element comprises:
    firing a second trigger for a second trigger table entry in the trigger table registry so that a second configuration state entry of the configuration state registry is updated to include the second predefined configuration state data; and
    transferring the second predefined configuration state data from the configuration state registry to the first control element.

24. The method of claim 21, wherein the first circuit device is a circuit subsystem of a system comprising a plurality of circuit subsystems, wherein each circuit subsystem of the plurality of circuit subsystems comprises:
    a corresponding plurality of control elements; and
    a corresponding configuration state registry that comprises predefined configuration states for the corresponding plurality of control elements.

* * * * *